United States Patent
Kim et al.

(10) Patent No.: US 8,336,906 B2
(45) Date of Patent: Dec. 25, 2012

(54) SEALING ASSEMBLY FOR AIR BAG DOOR

(75) Inventors: Hyun Kim, Hwaseong-si (KR); Ho Sik Choi, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 65 days.

(21) Appl. No.: 12/790,338

(22) Filed: May 28, 2010

(65) Prior Publication Data

US 2011/0062685 A1    Mar. 17, 2011

(30) Foreign Application Priority Data

Sep. 11, 2009    (KR) ...................... 10-2009-0085740

(51) Int. Cl.
*B60R 21/205*    (2011.01)
*B60R 21/215*    (2011.01)

(52) U.S. Cl. ................. 280/728.3; 280/728.2; 280/732

(58) Field of Classification Search ............ 280/728.2, 280/728.3, 732
See application file for complete search history.

(56) References Cited

U.S. PATENT DOCUMENTS

| | | | | |
|---|---|---|---|---|
| 5,303,951 A * | 4/1994 | Goestenkors et al. | ..... | 280/728.3 |
| 5,439,246 A * | 8/1995 | Ravenberg et al. | ........ | 280/728.3 |
| 5,527,063 A * | 6/1996 | Garner et al. | ............. | 280/728.2 |
| 5,527,064 A * | 6/1996 | Kai et al. | .................... | 280/728.2 |
| 5,533,749 A * | 7/1996 | Leonard et al. | ............ | 280/728.3 |
| 5,569,959 A * | 10/1996 | Cooper et al. | ............. | 280/728.3 |
| 5,582,424 A * | 12/1996 | Okuyama et al. | .......... | 280/728.3 |
| 5,588,669 A * | 12/1996 | Leonard et al. | ............ | 280/728.3 |
| 5,673,931 A * | 10/1997 | Gray et al. | ................. | 280/728.3 |
| 5,845,931 A * | 12/1998 | Nagy et al. | ................. | 280/728.3 |
| 5,851,023 A * | 12/1998 | Nagata et al. | .............. | 280/728.3 |
| 5,887,891 A * | 3/1999 | Taquchi et al. | ............. | 280/728.2 |
| 6,010,146 A * | 1/2000 | Otsuka et al. | .............. | 280/728.2 |
| 6,042,139 A * | 3/2000 | Knox | .......................... | 280/728.3 |
| 6,123,356 A * | 9/2000 | Gray et al. | ................. | 280/728.3 |
| 6,152,480 A * | 11/2000 | Iwanaga | ..................... | 280/728.3 |
| 6,170,857 B1 * | 1/2001 | Okada et al. | ............... | 280/728.1 |
| 6,250,669 B1 * | 6/2001 | Ohmiya | ........................ | 280/732 |
| 6,460,874 B1 * | 10/2002 | McDonnell et al. | ....... | 280/728.2 |
| 6,543,802 B1 * | 4/2003 | Uchiyama et al. | ......... | 280/728.2 |
| 6,616,176 B2 * | 9/2003 | Uchiyama et al. | ......... | 280/728.3 |
| 6,682,093 B2 * | 1/2004 | Tajima et al. | ................. | 280/732 |
| 6,726,239 B1 * | 4/2004 | Teranishi et al. | ........... | 280/728.3 |
| 6,902,185 B2 * | 6/2005 | North | ......................... | 280/728.3 |
| 7,104,566 B2 * | 9/2006 | Pinsenschaum et al. | .. | 280/728.3 |
| 7,121,577 B2 * | 10/2006 | Schenck et al. | ............ | 280/728.3 |
| 7,434,828 B2 * | 10/2008 | Okamoto et al. | .......... | 280/728.3 |
| 7,487,994 B2 * | 2/2009 | Okada et al. | .................. | 280/732 |
| 7,607,681 B2 * | 10/2009 | Okada et al. | ............... | 280/728.3 |

(Continued)

FOREIGN PATENT DOCUMENTS

DE            4137926 A1 * 5/1992

(Continued)

*Primary Examiner* — Ruth Ilan
*Assistant Examiner* — Laura Freedman
(74) *Attorney, Agent, or Firm* — Morgan, Lewis & Bockius LLP

(57) ABSTRACT

A sealing assembly for an air bag door is disclosed. The sealing assembly may include a crash pad formed with an opening portion, through which an air bag is deployed, wherein the opening portion is provided with a locking portion recessed with a predetermined length from an upper surface of the crash pad along the opening portion thereof, and an air bag door displaced on the locking portion and engaged thereto to cover the opening portion of the crash pad.

15 Claims, 4 Drawing Sheets

U.S. PATENT DOCUMENTS 7,914,039 B2 * 3/2011 Mazzocchi et al. ........... 280/732
7,921,957 B2 * 4/2011 Satou et al. .................. 180/274

FOREIGN PATENT DOCUMENTS

| JP | 11-151728 A | 6/1999 |
| JP | 2001-158318 A | 6/2001 |
| JP | 2004-243594 A | 9/2004 |
| JP | 2008-126972 A | 6/2008 |

* cited by examiner

SEALING ASSEMBLY FOR AIR BAG DOOR

CROSS-REFERENCE TO RELATED APPLICATION

The present application claims priority to Korean Patent Application No. 10-2009-0085740, filed on Sep. 11, 2009, the entire contents of which is incorporated herein for all purposes by this reference.

BACKGROUND OF THE INVENTION

1. Field of the Invention

The present invention relates to a sealing structure for a door equipped with a passenger air bag, and more particularly, to a sealing assembly for an air bag door which can enhance adherence and sealing performance between a crash pad and the Air bag door.

2. Description of Prior Art

In general, a passenger air bag means an air bag for protecting a passenger next to a driver.

The passenger air bag is installed in an air bag door connected to a desired position of a crash pad, and the air bag door is configured such that it is opened at the time of deployment of the air bag.

FIG. 1 is a cross-sectional view illustrating a structure of the air bag door according to a related art.

The structure of the air bag door according to a related art includes, as shown in FIG. 1, a chute member 20 provided at a rear side of a crash pad 10 and having an opening 21, through which an air bag is deployed, an air bag door 30 provided in front of the crash pad 10 and covering the opening 21 of the chute member 20, and an air bag module 40 mounted on the chute member 20 and detecting shock of a vehicle to deploy the air bag.

The air bag door 30 and the chute member 20 are connected to the crash pad 10 by means of rivet or bolt 50.

For the structure of the Air bag door with an aesthetic appearance, a skin layer 61 is formed on an outer circumference of the crash pad 10, and a foam layer 60 is formed between the crash pad 10 and the skin layer 61 by discharging a foam solution therebetween.

In the structure of the air bag door according to the related art, however, in a case where the foam solution is discharged between the crash pad 10 and the skin layer 61, there is a problem in that the foam solution is leaked between the crash pad 10 and the air bag door 30 by discharging pressure of the foam solution.

Moreover, in the structure of the air bag door according to the related art, since the air bag door 30 and the chute member 20 are separately manufactured and are connected to each other by means of a plurality of bolts 50, a manufacturing process and assembling process are complicated, and thus a manufacturing cost is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a sealing assembly for an air bag door which can enhance adherence and sealing performance between a crash pad and the air bag door, prevent leakage of a foam solution, and reducing an assembling and manufacturing cost.

In an aspect of the present invention, the sealing assembly for an air bag door may include a crash pad formed with an opening portion, through which an air bag is deployed, wherein the opening portion is provided with a locking portion recessed with a predetermined length from an upper surface of the crash pad along the opening portion thereof, and an air bag door displaced on the locking portion and engaged thereto to cover the opening portion of the crash pad.

The locking portion may be formed in a stepped shape recessed with the predetermined length from the upper surface of the crash pad along the opening portion.

The crash pad may include a first locking protrusion protruding from the upper surface of the crash pad toward the opening portion to form an engaging portion between the locking portion and the first locking protrusion, and wherein an end portion of the air bag door is fitted into the engaging portion and supported by the locking portion of the crash pad.

The end portion of the airbag door may be a flange portion extending from a door portion of the airbag door with a predetermined length into the engaging portion of the crash pad.

A rear surface of the door portion may be provided with a cut groove and a hinge groove which are formed in a rectangular shape and broken and opened at the time of deployment of the air bag.

The air bag door may further include a chute portion on which an air bag module for deploying the air bag is mounted.

The door portion and the chute portion may be integrally formed.

The door portion and the chute portion may be monolithically formed to form a single body An outer circumference of the chute portion may be provided with a locking boss protruding toward the crash pad to form a receiving portion between the flange portion and the locking boss, and wherein the locking portion of the crash pad is engaged in the receiving portion.

The locking portion of the crash pad may include a second locking protrusion protruding toward the locking boss and placed thereto in the receiving portion of the airbag door.

An outer circumference of the chute portion may be provided with an engaging hole at a lower portion thereof, to which the air bag module is fitted.

The door portion and the flange portion may be connected by a bending portion, wherein thickness of the bending portion is smaller than thickness of the flange portion.

With the above description, according to the sealing assembly for the air bag door, the opening portion formed on the crash pad is provided with the locking portion for supporting the air bag door, it is possible to prevent a foam solution from leaking between the crash pad and the air bag door and thus improving a product value.

Further, the inner surface of the crash pad is provided with the engaging portion to which the end portion of the air bag door is fitted, it is possible to enhance the engagement performance and the adherence of the air bag door, thereby preventing the foam solution from leaking.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
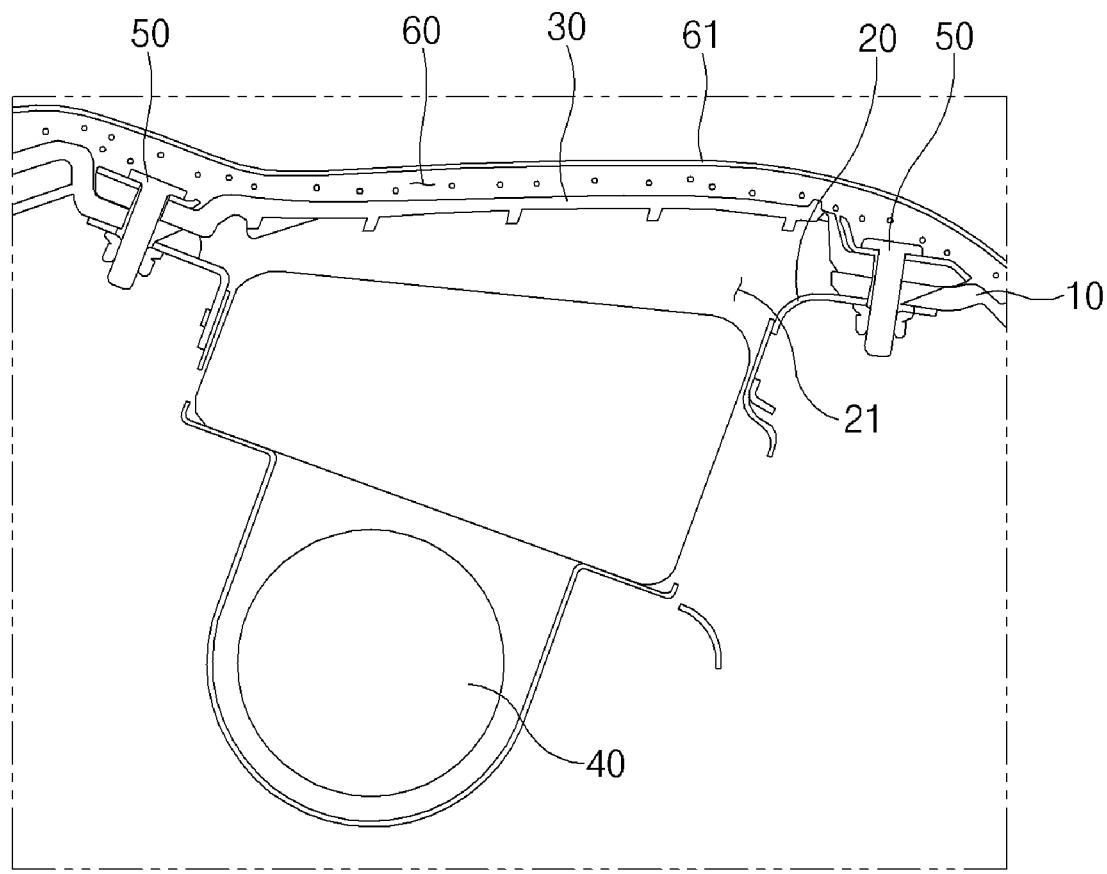
FIG. 1 is a cross-sectional view illustrating a structure of an air bag door according to a related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
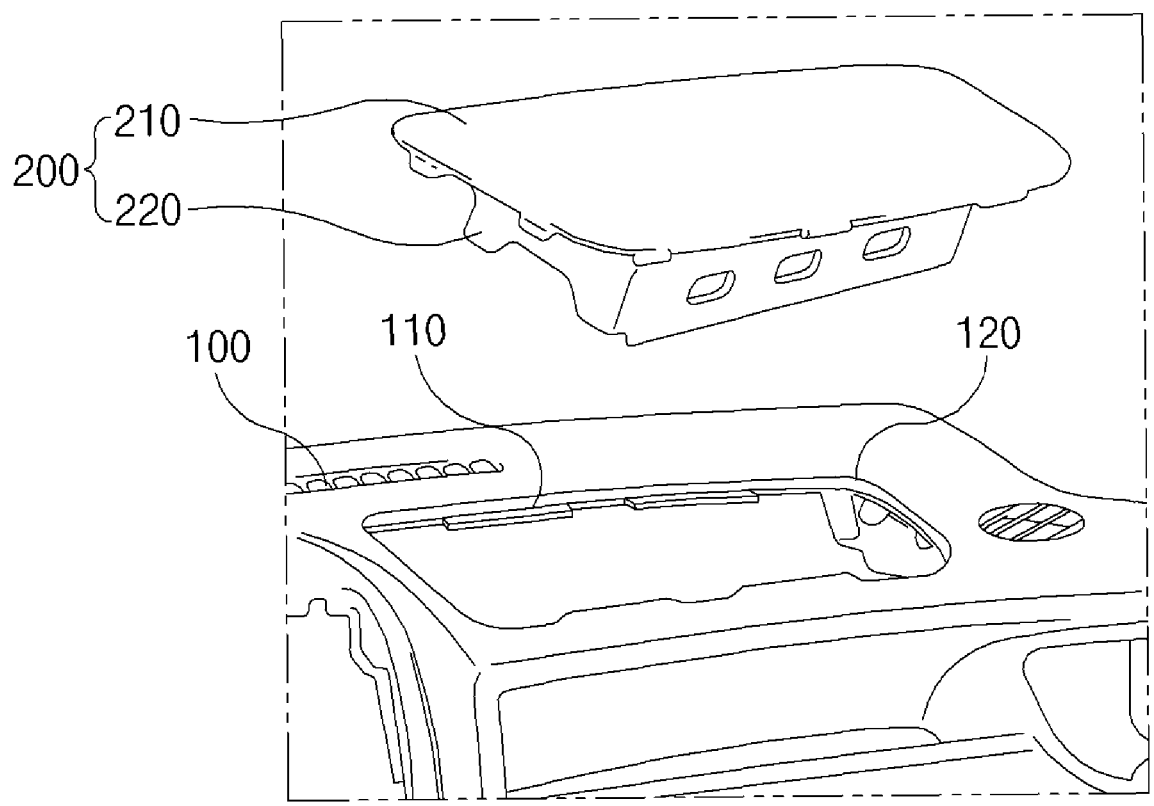
FIG. 2 is a perspective view illustrating an exemplary sealing assembly of an air bag door according to the present invention.
Figure 3:
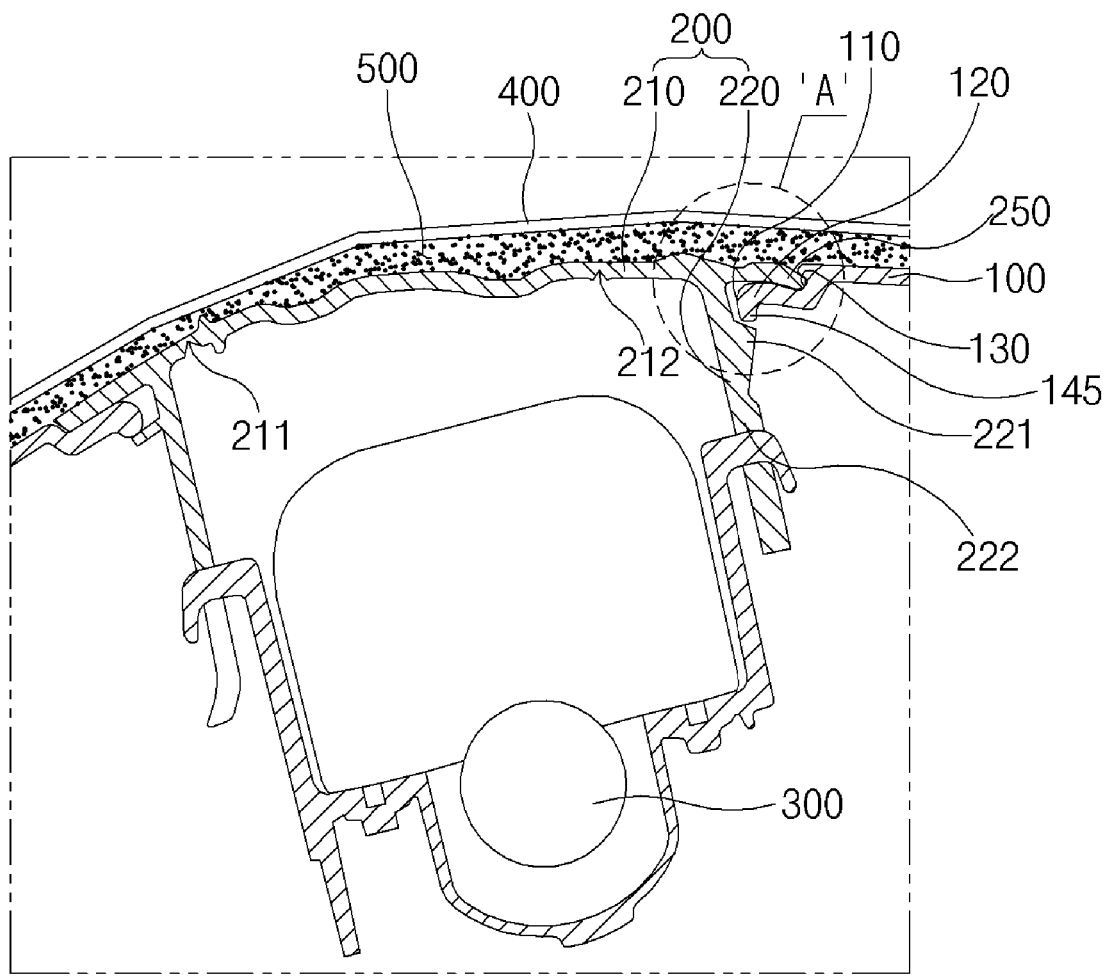
FIG. 3 is a cross-sectional view illustrating an exemplary sealing assembly of an air bag door according to the present invention.
Figure 4:
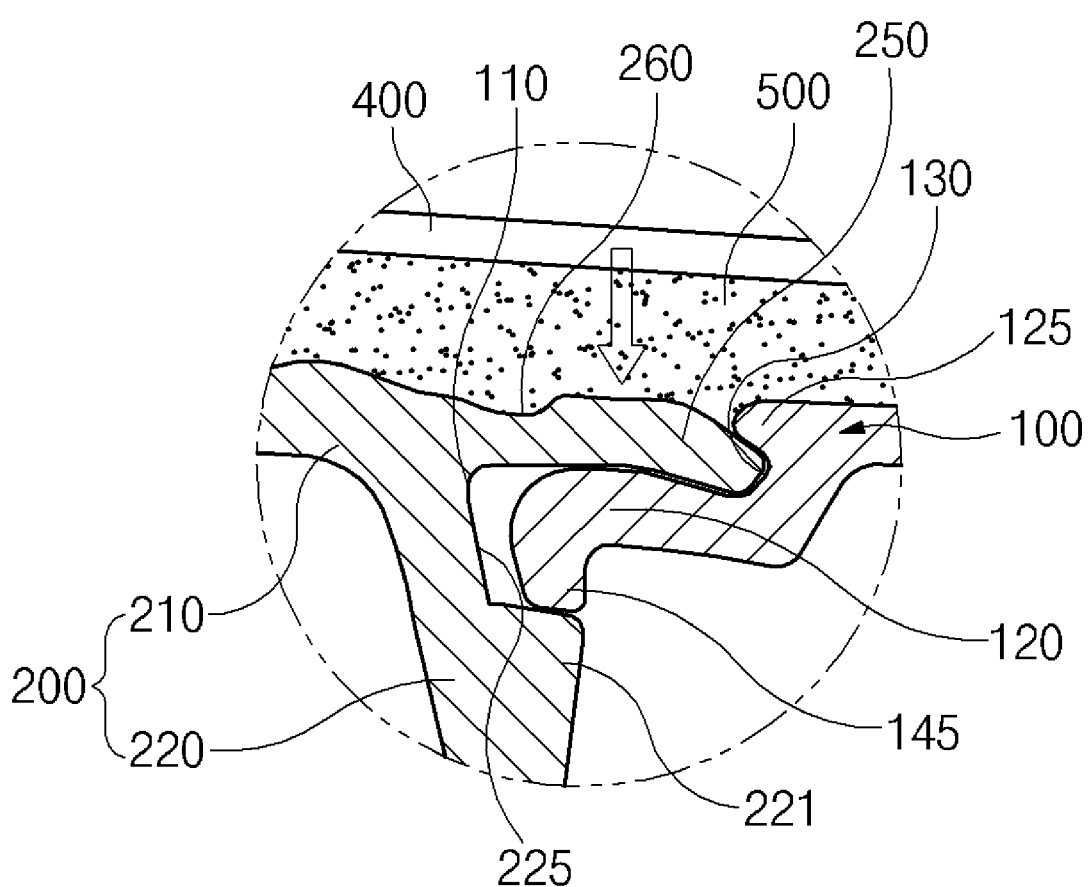
FIG. 4 is an enlarged cross-sectional view taken along a portion A in FIG. 3.

FIGS. 2 to 4 show a sealing assembly for an air bag door according to an exemplary embodiment of the present invention.

The sealing assembly for the air bag door is a technique for preventing a foam solution form leaking between a crash pad 100 and an air bag door 200 when the foam solution for forming a foam layer 500 is discharged after formation of a skin layer 400, thereby enhancing adherence and sealing performance between the crash pad 100 and the air bag door 200, as shown in FIGS. 2 and 3.

More specifically, the sealing assembly for the air bag door according to an exemplary embodiment of the present invention is adapted to enhance a sealing performance of the air bag door, and includes the crash pad 100, and the air bag door 200 connected to the crash pad 100 and opened at the time of deployment of an air bag, and an air bag module 300 is mounted on the air bag door 200.

The crash pad 100 is formed with an opening portion 110 at a desired position, through which the air bag is deployed. The opening portion 110 is provided with a locking portion 120 formed to be recessed from an upper surface of the crash pad 100 with a predetermined length to support the air bag door 200. The crash pad 100 may include a first locking protrusion 125 protruding toward the opening portion 110. An engaging portion 130 is formed between the locking portion 120 and the first locking protrusion 125, and an end portion of the air bag door 200 is engaged to the engaging portion 130.

More specifically, the locking portion 120 is formed in a stepped shape recessed from the upper surface of the opening portion 110 with a predetermined length. The engaging portion 130 is formed in a concave portion in such a way that it is recessed between the first locking protrusion 125 and the locking portion 120. The end portion of the air bag door 200 may be a flange portion 250.

The air bag door 200 includes a door portion 210 opened at the time of deployment of the air bag, and a chute portion 220 on which the air bag module 300 for deploying the air bag is mounted.

The door portion 210 is connected to the flange portion 250 by a bending portion 260, wherein thickness of the bending portion 260 is smaller than thickness of the flange portion 250, and the flange portion 250 is supported on the upper surface of the locking portion 120 to cover the opening portion 110.

A rear surface of the door portion 210 is provided with a cut groove 211 and a hinge groove 212 which are broken at the time of deployment of the air bag.

Furthermore, the flange portion 250 comes closely in contact with the upper surface of the locking portion 120, and the flange portion 250 is pushed by discharging pressure of the foam solution, thereby increasing the adherence and the sealing performance between the flange portion 250 and the locking portion 120. As a result, it is possible to prevent the foam solution from leaking between the crash pad 100 and the flange portion 250.

In addition, the bending portion 260 of the airbag door 200 may be bent by discharging pressure of the foam solution and thus the flange portion 250 of the door portion 210 may further come closely in contact with the upper surface of the locking portion 120, thereby increasing the adherence and the sealing performance.

Further, the flange portion 250 of the door portion 210 is supported by the locking portion 120, and is fitted into the engaging portion 130 of the crash pad 100. As a result, a contact surface between the flange portion 250 and the crush pad 100 is increased to effectively prevent the leakage of the foam solution and thus maintaining a reliably engaging force of the door portion 210.

The cut groove 211 and the hinge groove 212 are formed on the rear surface of the air bag door 210 in a desired depth at the time of forming the air bag door 200. More specifically, the cut groove 211 is broken by the pressure of the air bag at the time of deployment of the air bag, and the broken portion is developed around the hinge groove 212 to open the door portion 210.

In an exemplary embodiment of the present invention, a thickness of the cut groove 211 may be smaller than thickness of the hinge groove 212 such that the cut groove 211 may be broken faster than the hinge groove 212.

The chute portion 220 is formed integrally with the lower surface of the door portion 210, and the outer circumference of the chute portion 220 is provided with a locking boss 221 at the upper portion thereof to form a receiving portion 225 between the flange portion 250 and the locking boss 221.

The locking portion 120 of the crash pad 100 may include a second locking protrusion 145 protruding toward the locking boss 221. The second locking protrusion 145 of the crash pad 100 may be locked and fixed into the receiving portion 225 of the airbag door 200 such that the door portion 210 can be firmly fixed to the crash pad 100 by the locking boss 221 and the second locking protrusion 145.

The outer circumference of the chute portion 220 may be provided with an engaging hole 222 at the lower portion thereof, and the air bag module 400 for deploying the air bag is fitted into the engaging hole 222.

The air bag door 200 is fitted into the opening portion 110 of the crash pad 100 by using the chute portion 220, without using separate bolts, thereby easily engaging and manufacturing the air bag.

A method of assembling the sealing assembly of the air bag door including the above-described structure and a method of forming the skin layer will be described.

First, the air bag door 200 integrally formed with the chute portion 220 and the door portion 210 is inserted into the opening portion 110 of the crash pad 100. The door portion 210 is closely supported by the locking portion 120 of the crash pad 100. The flange portion 250 of the door portion 210 is fitted into the engaging portion 130 of the crash pad 100, and the locking boss 221 of the chute portion 220 is engaged to the inner surface of the opening portion 110 in being locked to the second locking protrusion 145.

Then, the connection between the crash pad 100 and the air bag door 200 is completed by fitting the air bag module 300 into the engaging hole 222 of the chute portion 220.

If the installation of the air bag door 200 to the crash pad 100 is completed, the crash pad 100 is placed in a skin layer mold in which a skin layer is positioned, and then the skin layer 400 is formed by combining the mold.

A foam layer 500 may be formed between the crash pad 100 and the skin layer 400 by discharging the foam solution there between. In this instance, the door portion 210 is pushed in a direction indicated by an arrow in FIG. 4 by the discharging pressure of the foam solution, thereby enhancing the adherence and the sealing performance between the crash pad 100 and the locking portion 120. As a result, it is possible to prevent the foam solution from leaking between the crash pad 100 and the air bag door 200.

Moreover, since the flange portion 250 of the door portion 210 is fitted into the engaging portion 130 of the crash pad 100, it is possible to prevent the foam solution from leaking between the crash pad 100 and the air bag door 200 by the increased contact surface.

For convenience in explanation and accurate definition in the appended claims, the terms "upper", "lower", "front", "rear", "inner", and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sealing assembly for an air bag door comprising:
a crash pad formed with an opening portion, through which an air bag is deployed, wherein the opening portion is provided with a locking portion recessed with a predetermined length from an upper surface of the crash pad along the opening portion thereof; and
an air bag door engaged to the locking portion and covering the opening portion of the crash pad;
wherein a rear surface of a door portion is provided with a cut groove and a hinge groove which are formed in a rectangular shape and broken and opened at the time of deployment of the air bag;
wherein the crash pad includes a first locking protrusion protruding from the upper surface of the crash pad toward the opening portion to form an engaging portion between the locking portion and the first locking protrusion, and wherein an end portion of the air bag door is fitted into the engaging portion and supported by the locking portion of the crash pad.

2. The sealing assembly for the air bag door according to claim 1, wherein the locking portion is formed in a stepped shape recessed with the predetermined length from the upper surface of the crash pad along the opening portion.

3. The sealing assembly for the air bag door according to claim 1, wherein the end portion of the airbag door is a flange portion extending from the door portion of the airbag door with a predetermined length into the engaging portion of the crash pad.

4. The sealing assembly for the air bag door according to claim 3, wherein the air bag door further includes a chute portion on which an air bag module for deploying the air bag is mounted.

5. The sealing assembly for the air bag door according to claim 4, wherein the door portion and the chute portion are integrally formed.

6. The sealing assembly for the air bag door according to claim 4, wherein the door portion and the chute portion are monolithically formed to form a single body.

7. The sealing assembly for the air bag door according to claim 4, wherein an outer circumference of the chute portion is provided with a locking boss protruding toward the crash pad to form a receiving portion between the flange portion and the locking boss, and wherein the locking portion of the crash pad is engaged in the receiving portion.

8. The sealing assembly for the air bag door according to claim 7, wherein the locking portion of the crash pad includes a second locking protrusion protruding toward the locking boss and placed thereto in the receiving portion of the airbag door.

9. The sealing assembly for the air bag door according to claim 4, wherein an outer circumference of the chute portion is provided with an engaging hole at a lower portion thereof, to which the air bag module is fitted.

10. The sealing assembly for the air bag door according to claim 3, wherein the door portion and the flange portion are connected by a bending portion.

11. The sealing assembly for the air bag door according to claim 10, wherein the thickness of the bending portion is smaller than the thickness of the flange portion.

12. The sealing assembly for the air bag door according to claim 1, wherein the airbag door including the door portion and a chute portion are integrally formed.

13. The sealing assembly for the air bag door according to claim 1, wherein the airbag door including the door portion and a chute portion are monolithically formed to form a single body.

14. A sealing assembly for an air bag door comprising:
a crash pad formed with an opening portion, through which an air bag is deployed, wherein the opening portion is provided with a locking portion recessed with a predetermined length from an upper surface of the crash pad along the opening portion thereof; and
an air bag door engaged to the locking portion and covering the opening portion of the crash pad;

wherein a rear surface of a door portion is provided with a cut groove and a hinge groove which are formed in a rectangular shape and broken and opened at the time of deployment of the air bag;

wherein the thickness of the cut groove is smaller than the thickness of the hinge groove such that the cut groove is broken faster than the hinge groove.

15. A sealing assembly for an air bag door comprising:

a crash pad formed with an opening portion, through which an air bag is deployed, wherein the opening portion is provided with a locking portion recessed with a predetermined length from an upper surface of the crash pad along the opening portion thereof; and an air bag door engaged to the locking portion and covering the opening portion of the crash pad;

wherein a rear surface of a door portion is provided with a cut groove and a hinge groove which are formed in a rectangular shape and broken and opened at the time of deployment of the air bag;

wherein the airbag door including the door portion and a chute portion are monolithically formed to form a single body;

wherein the thickness of the cut groove is smaller than the thickness of the hinge groove such that the cut groove is broken faster than the hinge groove.

* * * * *